United States Patent
Grigsby et al.

(10) Patent No.: US 8,615,396 B2
(45) Date of Patent: Dec. 24, 2013

(54) VOICE RESPONSE UNIT MAPPING

(75) Inventors: Travis M. Grigsby, Austin, TX (US);
Frank L. Jania, Chapel Hill, NC (US);
Steven M. Miller, Cary, NC (US); Lisa A. Seacat, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 1123 days.

(21) Appl. No.: 12/202,691

(22) Filed: Sep. 2, 2008

(65) Prior Publication Data

US 2010/0057456 A1 Mar. 4, 2010

(51) Int. Cl.
*G10L 15/26* (2006.01)
*G10L 21/00* (2013.01)
*G06F 3/16* (2006.01)

(52) U.S. Cl.
USPC .............. 704/235; 704/270; 715/727

(58) Field of Classification Search
None
See application file for complete search history.

(56) References Cited

U.S. PATENT DOCUMENTS

| | | | |
|---|---|---|---|
| 6,058,179 A | 5/2000 | Shaffer et al. | |
| 6,131,810 A | 10/2000 | Weiss et al. | |
| 6,354,490 B1 | 3/2002 | Weiss et al. | |
| 6,412,073 B1 | 6/2002 | Rangan | |
| 6,754,332 B1 | 6/2004 | Kneipp et al. | |
| 6,788,770 B1 | 9/2004 | Cook et al. | |
| 6,965,664 B1 | 11/2005 | McIntosh et al. | |
| 6,999,448 B1 | 2/2006 | Klein | |
| 7,505,965 B2 * | 3/2009 | Ivanov | 1/1 |
| 7,509,266 B2 | 3/2009 | Rogers et al. | |
| 7,515,695 B1 | 4/2009 | Chan et al. | |
| 7,542,902 B2 * | 6/2009 | Scahill et al. | 704/251 |
| 7,715,531 B1 * | 5/2010 | Golding et al. | 379/88.18 |
| 7,715,547 B2 | 5/2010 | Ibbotson et al. | |
| 7,742,580 B2 | 6/2010 | Cooper et al. | |
| 7,908,381 B2 | 3/2011 | Koch et al. | |
| 7,929,562 B2 | 4/2011 | Petrovykh | |
| 8,046,220 B2 * | 10/2011 | Agarwal et al. | 704/235 |
| 2002/0077819 A1 * | 6/2002 | Girardo | 704/260 |
| 2003/0074091 A1 | 4/2003 | Kim | |
| 2003/0161449 A1 | 8/2003 | Plan | |
| 2004/0093211 A1 | 5/2004 | Reynolds et al. | |
| 2004/0122941 A1 | 6/2004 | Creamer et al. | |
| 2004/0218737 A1 | 11/2004 | Kelly | |
| 2005/0033582 A1 * | 2/2005 | Gadd et al. | 704/277 |
| 2005/0081152 A1 | 4/2005 | Commarford et al. | |
| 2005/0147219 A1 | 7/2005 | Comerford | |
| 2005/0201544 A1 | 9/2005 | Book et al. | |
| 2006/0245557 A1 | 11/2006 | Paden et al. | |
| 2006/0285662 A1 | 12/2006 | Yin et al. | |

(Continued)

FOREIGN PATENT DOCUMENTS

| | | |
|---|---|---|
| KR | 20000072653 | 12/2000 |
| KR | 100451097 | 12/2004 |

OTHER PUBLICATIONS

Office Action for U.S. Appl. No. 12/245,212 dated Jun. 12, 2013.

*Primary Examiner* — Brian Albertalli
(74) *Attorney, Agent, or Firm* — Winstead, P.C.

(57) ABSTRACT

A system, method and program product for mapping voice response units (VRUs). A system is provided that includes: an interrogation system for interrogating a VRU and gathering a hierarchical set of options associated with the VRU; a map building system for converting the hierarchical set of options into a VRU map suitable for display; and a user interface for displaying the VRU map to an end user.

17 Claims, 3 Drawing Sheets

(56) References Cited

U.S. PATENT DOCUMENTS

| | | | |
|---|---|---|---|
| 2006/0287866 A1* | 12/2006 | Cross et al. | 704/275 |
| 2007/0024454 A1 | 2/2007 | Singhai | |
| 2007/0061132 A1* | 3/2007 | Bodin et al. | 704/200 |
| 2007/0081655 A1* | 4/2007 | Sun et al. | 379/218.01 |
| 2008/0039010 A1 | 2/2008 | Vance et al. | |
| 2008/0046363 A1 | 2/2008 | Ali et al. | |
| 2008/0249936 A1 | 10/2008 | Miller et al. | |
| 2008/0298560 A1 | 12/2008 | Purdy et al. | |
| 2009/0042539 A1 | 2/2009 | Jiang et al. | |
| 2010/0054430 A1 | 3/2010 | Grigsby et al. | |
| 2010/0057456 A1 | 3/2010 | Grigsby et al. | |
| 2010/0067670 A1 | 3/2010 | Grigsby et al. | |
| 2010/0088613 A1 | 4/2010 | DeLuca et al. | |
| 2010/0310059 A1 | 12/2010 | Davis et al. | |
| 2011/0173119 A1 | 7/2011 | Kumar et al. | |

* cited by examiner

VOICE RESPONSE UNIT MAPPING

FIELD OF THE INVENTION

This disclosure relates to voice response unit (VRU) telephony, and more particularly to a system and method for mapping VRU decision trees and menus on a displayable system such as a website.

BACKGROUND OF THE INVENTION

In telephony, interactive voice response (IVR) provides a phone technology that allows a computer or voice response unit (VRU) to detect voice and touch tones using a normal phone call. The VRU can respond with pre-recorded or dynamically generated audio to further direct callers on how to proceed. VRUs can be used to control almost any function where the interface can be broken down into a series of simple menu choices or options. Once constructed, VRUs generally scale well to handle large call volumes.

In operation, a caller dials a telephone number that is answered by the VRU. The VRU executes an application which is tied to the number dialed DNIS (Dialed Number Identification Service). As part of the application, prerecorded audio files or dynamically generated Text to Speech (TTS) audio explain the options available to the caller. The caller is given the choice to select options using DTMF tones or spoken words. Speech recognition is normally used to carry out more complex transactions and simplifies the application menu structure.

Unfortunately, interfacing with a VRU can be annoying for people as the presentation of information is inherently slow. Accordingly, there is a need in the art for allowing users to more effectively navigate VRUs to obtain a desired result.

SUMMARY OF THE INVENTION

The present invention relates to a system, method and program product for providing static VRU maps on a displayable interface such as a website for allowing users to expedite calls handled by VRUs. In one embodiment, there is a system for providing voice response unit (VRU) maps, comprising: an interrogation system for interrogating a VRU and gathering a hierarchical set of options associated with the VRU; a map building system for converting the hierarchical set of options into a VRU map suitable for display; and a user interface for displaying the VRU map to an end user.

In a second embodiment, there is a computer readable medium having a program product stored thereon for providing voice response unit (VRU) maps, comprising: program code for interrogating a VRU and gathering a hierarchical set of options associated with the VRU; program code for converting the hierarchical set of options into a VRU map suitable for display; and program code for displaying the VRU map to an end user.

In a third embodiment, there is a method of providing voice response unit (VRU) maps, comprising: interrogating a VRU and gathering a hierarchical set of options associated with the VRU; converting the hierarchical set of options into a VRU map suitable for display; and displaying the VRU map to an end user.

In a fourth embodiment, there is a method for deploying a system for providing voice response unit (VRU) maps, comprising: providing a computer infrastructure being operable to: interrogate a VRU and gathering a hierarchical set of options associated with the VRU; convert the hierarchical set of options into a VRU map suitable for display; and display the VRU map to an end user.

The illustrative aspects of the present invention are designed to solve the problems herein described and other problems not discussed.

BRIEF DESCRIPTION OF THE DRAWINGS

These and other features of this invention will be more readily understood from the following detailed description of the various aspects of the invention taken in conjunction with the accompanying drawings.

Figure 1:
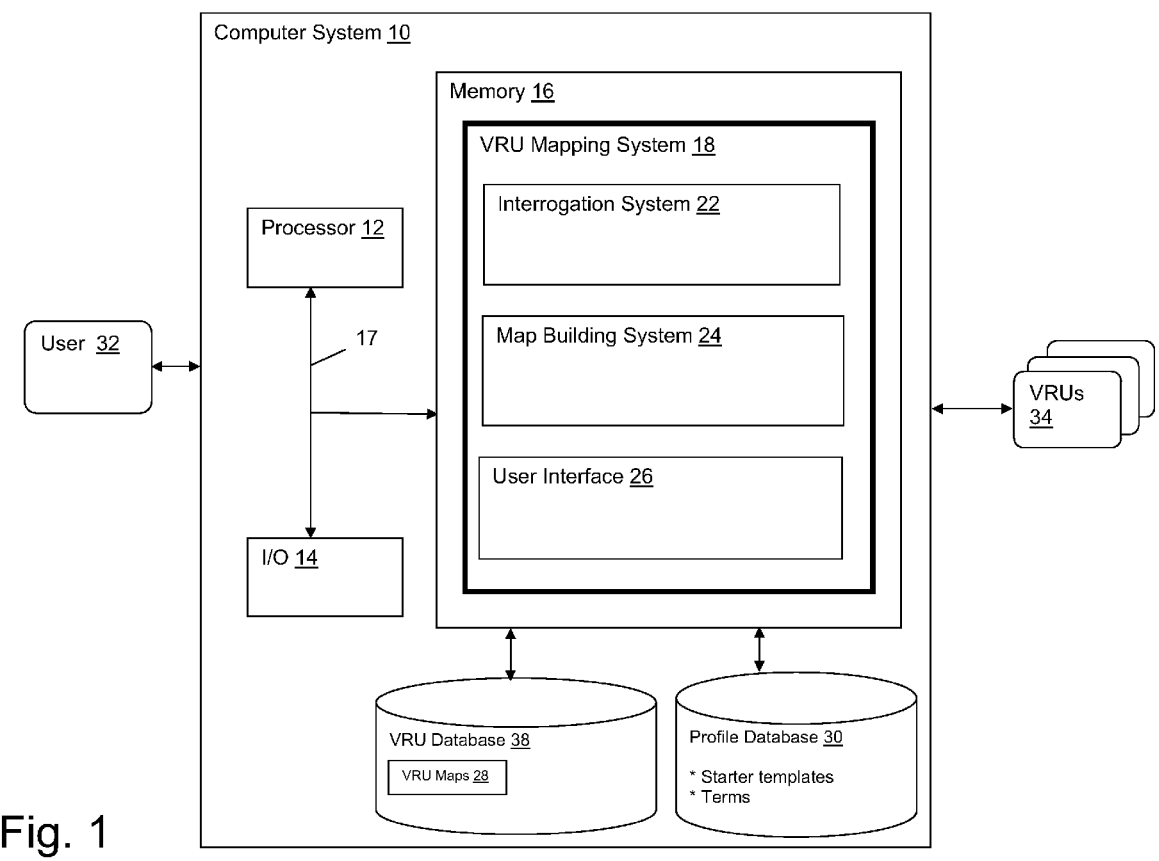
FIG. 1 depicts a computer system having a VRU mapping system in accordance with an embodiment of the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Referring to FIG. 1, a computer system 10 is shown having a VRU (voice response unit) mapping system 18 that allows a user 32 to view VRU maps 28 stored in a VRU database 38 via user interface 26. Each VRU map 28 is associated with an interactive VRU of an entity (e.g., business, help line, government agency, etc.). Thus, for example, user 32 can view the VRU map 28 of an entity before placing a call in order to more effectively navigate the VRU 34 of the entity. Each VRU map 28 includes a hierarchical set of options consisting of one or more levels.

VRU mapping system 18 includes an interrogation system 22 that automatically calls targeted VRUs 34 and utilizes speech recognition to identify and store all of the possible options (e.g., dial 1 for account information, dial two for payment options, etc). Map building system 24 converts the stored options into a VRU map 28 that can be displayed for the user (e.g., in the form of a decision tree or menu). Profile database 30 may be utilized as a starting point or template of what is expected for a given type of entity. For instance, in a given industry, it may be known that certain VRU options are almost always provided at the highest level of the hierarchy. Similarly, if the type of service being provided is known (e.g., a computer help line), then a predefined template may be utilized as a starting point. Profile database 30 may also assist the speech recognition process by facilitating the interpretation of ambiguous or unknown words or phrases. For instance, there may be commonly used industry specific terms spoken by the VRU 34 that are not readily known by the speech recognition system. Such terms could be stored in the profile database 30 to assist the speech recognition system in generating accurate options.

Figure 2:
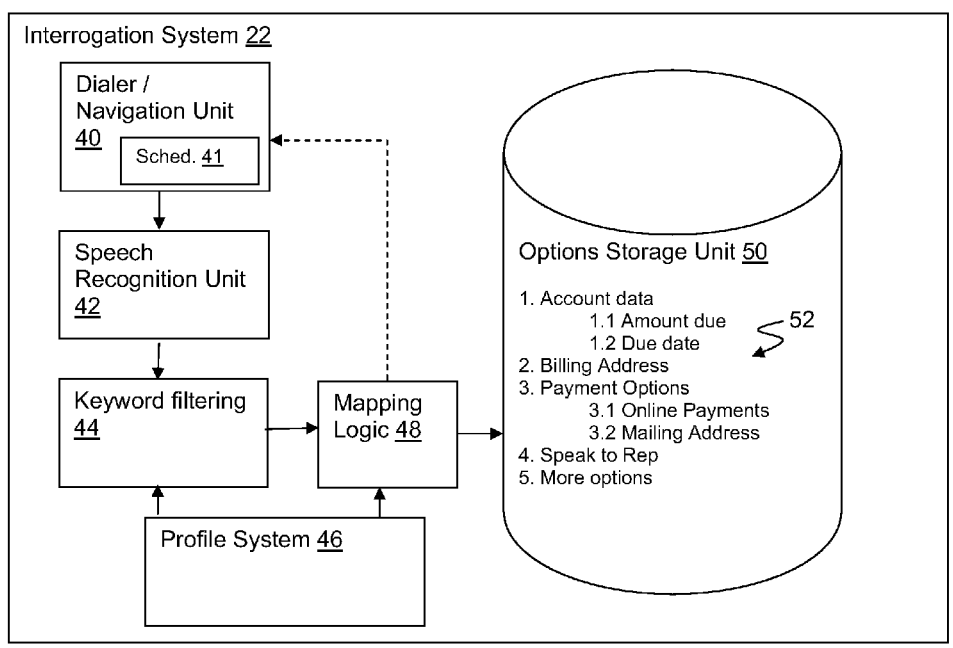
FIG. 2 depicts an interrogation system in accordance with an embodiment of the present invention.

FIG. 2 depicts a more detailed illustrative embodiment of interrogation system 22. In this embodiment, interrogation system 22 includes a dialer/navigation unit 40 for initiating a call with a targeted VRU and submitting the appropriate responses to navigate the VRU (e.g., providing a touch tone response). Each targeted VRU could be interrogated regularly (e.g., daily, weekly, etc.) based on a scheduler 41. Thus, if the VRU options changed, the resulting VRU map would be updated to reflect the changes.

As the options are spoken by the VRU, speech recognition unit 42 interprets the options and converts the speech to text. Keyword filtering 44 may be utilized to filter out the unnecessary verbiage from the interpreted text to create an "option tag". For instance, the option "dial 1 for your account balance" may be simply filtered to the VRU option tag: "1=account balance". As noted above, a profile system 46 may be utilized to help disambiguate terms, e.g., by comparing unfamiliar or ambiguous text with a list of expected options. After a VRU option tag 52 is determined, mapping logic 48 maps the VRU option tag 52 into an options storage unit 50. In this example, the VRU option tags 52 are stored in an outline form. Dialer/navigation unit 40 logically navigates the different options within the VRU until all of the options are collected and stored. In some cases, the VRU may have "unpublished" shortcuts or functions that could be discovered by the interrogation system 22. Such functions could for instance be discovered by having the dialer/navigation unit 40 attempt to dial random numbers or number sequences within the VRU. It is understood that the embodiment shown in FIG. 2 is not meant to be limiting on the scope of the invention, and other approaches for gathering the options from targeted VRUs could be utilized.

Figure 3:
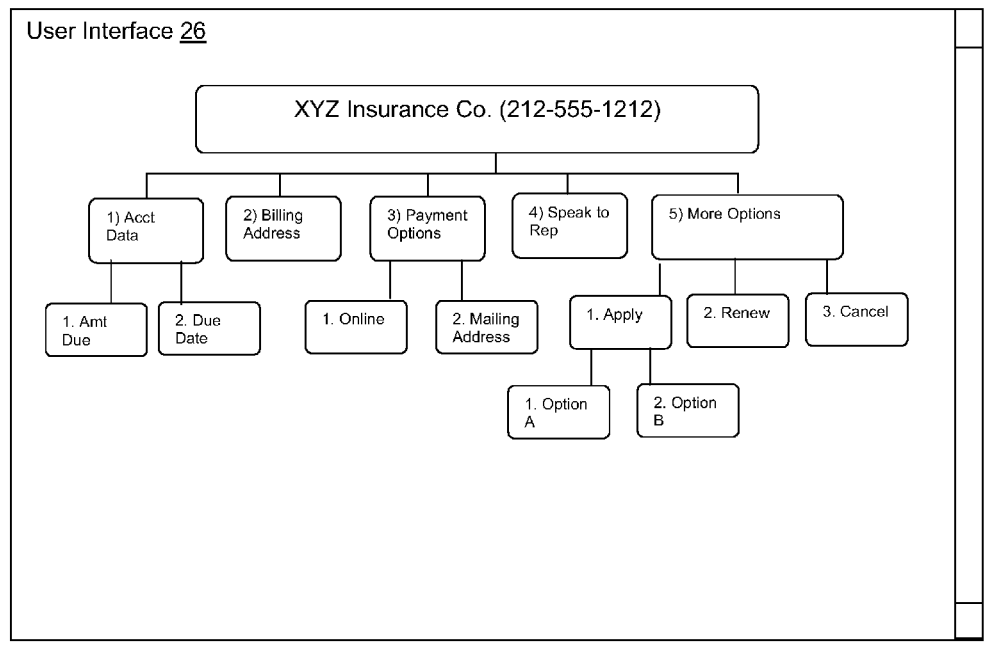
FIG. 3 depicts a user interface showing a VRU map in accordance with an embodiment of the present invention.

Once all of the options are collected, map building system 24 (FIG. 1) converts the data stored in the options storage unit 50 into a format suitable for display to the end user, e.g., into HTML for use on a website. An example of such a format is shown in FIG. 3 in which a user interface 26 depicts a tree structure of the VRU option tags 52 for XYZ insurance company. In this illustrative embodiment, by viewing the map, a user can quickly ascertain which options are required to obtain the desired information or goal at the VRU. Obviously, user interface 26 shown in FIG. 3 is but one of any number of possible presentation formats that could be utilized. In one further embodiment, the user could simply select the box containing the desired option (e.g., within a smart phone display) to cause the phone number and option sequence to be automatically dialed.

Referring again to FIG. 1, it is understood that computer system 10 may be implemented as any type of computing infrastructure. Computer system 10 generally includes a processor 12, input/output (I/O) 14, memory 16, and bus 17. The processor 12 may comprise a single processing unit, or be distributed across one or more processing units in one or more locations, e.g., on a client and server. Memory 16 may comprise any known type of data storage, including magnetic media, optical media, random access memory (RAM), read-only memory (ROM), a data cache, a data object, etc. Moreover, memory 16 may reside at a single physical location, comprising one or more types of data storage, or be distributed across a plurality of physical systems in various forms.

I/O 14 may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, etc. Bus 17 provides a communication link between each of the components in the computer system 10 and likewise may comprise any known type of transmission link, including electrical, optical, wireless, etc. Although not shown, additional components, such as cache memory, communication systems, system software, etc., may be incorporated into computer system 10.

Access to computer system 10 may be provided over a network such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment.

It should be appreciated that the teachings of the present invention could be offered as a business method on a subscription or fee basis. For example, a computer system 10 comprising a VRU mapping system 18 could be created, maintained and/or deployed by a service provider that offers the functions described herein for customers. That is, a service provider could offer to deploy or provide interrogate VRUS 34 and provide VRU maps 28 as described above.

It is understood that in addition to being implemented as a system and method, the features may be provided as a program product stored on a computer-readable medium, which when executed, enables computer system 10 to provide a VRU mapping system 18. To this extent, the computer-readable medium may include program code, which implements the processes and systems described herein. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 16 and/or a storage system.

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like. Further, it is understood that terms such as "component" and "system" are synonymous as used herein and represent any combination of hardware and/or software capable of performing some function(s).

The block diagrams in the figures illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical function(s). It should also be noted that the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams can be implemented by special purpose hardware-based systems which perform the specified functions or acts, or combinations of special purpose hardware and computer instructions.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A system for providing voice response unit (VRU) maps, comprising:
    an interrogation system for interrogating a VRU and gathering a hierarchical set of options associated with the VRU;
    a map building system for converting the hierarchical set of options into a VRU map suitable for display; and
    a user interface for displaying the VRU map to an end user;
    wherein the interrogation system includes a profile system for providing a set of starter templates for mapping the hierarchical set of options.

2. The system of claim 1, wherein the interrogation system includes a system for automatically calling the VRU and navigating the hierarchical set of options.

3. The system of claim 2, wherein the interrogation system includes a speech recognition system for converting spoken options broadcast from the VRU to text.

4. The system of claim 2, wherein the interrogation system includes the profile system for resolving ambiguous options spoken by the VRU.

5. The system of claim 1, wherein the VRU map comprises a tree.

6. The system of claim 1, wherein the user interface comprises a web page.

7. A computer readable medium having a program product stored thereon for providing voice response unit (VRU) maps, comprising:
    program code for interrogating a VRU and gathering a hierarchical set of options associated with the VRU;
    program code for converting the hierarchical set of options into a VRU map suitable for display; and
    program code for displaying the VRU map to an end user;
    wherein the program code for interrogating includes a set of starter templates for mapping the hierarchical set of options.

8. The computer readable medium of claim 7, wherein the program code for interrogating automatically calls the VRU and navigates the hierarchical set of options.

9. The computer readable medium of claim 8, wherein the program code for interrogating includes a speech recognition system for converting spoken options broadcast from the VRU to text.

10. The computer readable medium of claim 8, wherein the program code for interrogating includes a profile database for resolving ambiguous options spoken by the VRU.

11. The computer readable medium of claim 7, wherein the VRU map comprises a tree.

12. The computer readable medium of claim 7, wherein the user interface comprises a web page.

13. A method of providing voice response unit (VRU) maps, comprising:
    interrogating a VRU and gathering a hierarchical set of options associated with the VRU;
    converting the hierarchical set of options into a VRU map suitable for display; and
    displaying, by a processor, the VRU map to an end user;
    wherein the interrogating includes utilizing a set of starter templates for mapping the hierarchical set of options.

14. The method of claim 13, wherein the interrogating automatically calls the VRU and navigates the hierarchical set of options.

15. The method of claim 14, wherein the interrogating includes converting spoken options broadcast from the VRU to text.

16. The method of claim 14, wherein the interrogating includes providing a profile database for resolving ambiguous options spoken by the VRU.

17. A method for deploying a system for providing voice response unit (VRU) maps, comprising:
    providing a computer infrastructure being operable to:
        interrogate a VRU and gathering a hierarchical set of options associated with the VRU;
        convert the hierarchical set of options into a VRU map suitable for display; and
        display, by a processor, the VRU map to an end user;
    wherein the interrogating includes utilizing a set of starter templates for mapping the hierarchical set of options.

* * * * *